Sept. 23, 1958 R. H. KOENIG Re. 24,541

TAPE SWITCH

Original Filed Jan. 6, 1954

INVENTOR.
ROBERT H. KOENIG

United States Patent Office

Re. 24,541
Reissued Sept. 23, 1958

24,541

TAPE SWITCH

Robert H. Koenig, Cambria Heights, N. Y.

Original No. 2,770,696, dated November 13, 1956, Serial No. 402,460, January 6, 1954. Application for reissue April 2, 1958, Serial No. 728,504

3 Claims. (Cl. 200—86)

Matter enclosed in heavy brackets [ ] appears in the original patent but forms no part of this reissue specification; matter printed in italics indicates the additions made by reissue.

This invention relates to electrical switches and more particularly to electrical switches having a continuous tape-like form and adapted to be actuated by the weight of a person or vehicle passing over it.

Conventional pressure type strip switches generally have a plurality of spaced insulators and this plurality of parts limits the operability and reliability since they are non-homogeneous in nature and therefore operate differently at different points along their length.

Another problem with conventional switches of this type is that it is not feasible to bend them around corners or to coil unused portions into a small radius since this tends to short circuit them.

Conventional strip type switches rely on the flexibility of the rubber sheathing for mechanical functions besides offering protective covering to the switch. They therefore are not as rugged and durable as the switch of the present invention which could operate without the rubber jacket.

The present invention comprises an electrical switch having a pair of spaced continuous conducting strips having a slight transverse concavity. The two conducting strips are spaced apart by two smaller strips of insulating material and the whole assembly is covered with a rubber or plastic jacket. The finished product looks very much like an electric cable except that it has an extremely flat cross section.

In operation, the strip is laid on the ground and anything pressing down on it such as the wheel of a car or a person's foot will flatten the upper conducting member so that it touches the bottom, thereby making the switch contact.

The invention can be successfully manufactured in any length with a single strip for each conductor, however it is desirable to construct one of the conducting strips of overlapping segments to prevent buckling of the inner conductor when the tape switch is coiled. Because the conductors take different radii when coiled, one of them must be made extensible or compressible in length to prevent buckling and consequent damage to the plastic jacket. A simple and satisfactory construction of the segmented conductor is shown.

The segmentation of one conductor is required only where the tape switch is to be made coilable. Where short lengths are to be manufactured for example, to form a switching floor mat, this segmentation is not necessary.

A primary advantage of the present invention is that it can be easily manufactured at low cost and it can be covered simply by plastic strips sealed at the edges or by conventional cable covering extrusion process.

Another advantage of the present invention is that the functional part of the switch is in itself a rugged and encased strip which will operate independent of any protective jacket. Because of this construction it is not subject to short circuits caused by metallic chips piercing the plastic jacket, a common fault of other types.

Accordingly, a principal object of the invention is to provide reliable and improved electrical switch means.

Another object of the present invention is to provide new and improved electrical switch means of the type adapted to be actuated by foot or vehicular pressure.

Another object of the present invention is to provide new and improved tape switch which is homogeneous and continuous in action.

Another object of the present invention is to provide new and improved tape switch which may be coiled into small radii or bent without short circuiting it.

Another object of the present invention is to provide a new and improved tape switch which is flatter than types heretofore constructed.

Another object of the present invention is to provide a new and improved tape switch which is extremely rugged and durable and easy to manufacture.

These and other objects of the invention will be apparent from the following specifications and drawings of which:

Switches of the present type may be used for burglar alarm systems, for actuating automatically operated doors, for timing, detecting or counting vehicles, and other similar purposes.

Figure 1:
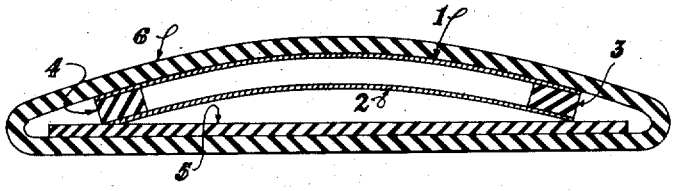
Figure 1 is a cross sectional view of an embodiment of the invention.

Figure 1 shows a cross sectional view of an embodiment of the invention. It comprises two continuous conducting strips 1 and 2, the strips having slight transverse curvature so that they are arched away from the floor level. The conducting strips are separated by strips of insulating material 3 and 4 which are placed between the conducting strips and along the outer edges thereof.

The strip and insulator assembly rests on another insulating strip 5 and the entire assembly is covered by a weather proof jacket 6 of rubber or plastic.

The conducting strips are preferably made of a metal having resilient or springy characteristics, for instance, spring steel or a copper alloy such as beryllium copper. The conducting strips should be flexible and are approximately one-half inch wide, and can be as thin as .005 inch.

In many applications, it is necessary to bend the tape around the corners or over curb stones and the like, so that the assembly of the conducting strips and the separating insulating material should be fairly flexible. In many applications, for instance, those of a temporary nature, the length of switch tape available will be too long for its intended use and it is, therefore, necessary that the tape switch be adapted to be coiled up in a convenient manner without short circuiting the switch.

The spacing insulators 3 and 4 may be of any insulating material which is sufficiently flexible such as rubber or a plastic. The outer jacket 6 is preferably of rubber or a flexible plastic which is resistant to water, oil and abrasion and which is generally weather proof. The purpose of this is that the tape switch may be used outside, for instance, on roadways in making a traffic survey or at gas stations to give notice of an entering car. Because of the transverse curvature of the tempered metal strips and the unique restoring properties of such concaval strip, it is practically impossible to deform it permanently. The tape switch may be made quite thin so that it will hardly be noticeable even when stepped on and would not transmit any bumps to a passing vehicle.

One-eighth inch overall thickness is typical for this dimension.

Figure 2:
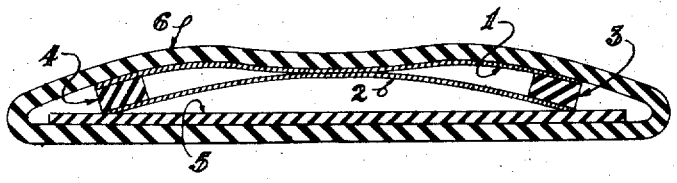
Figure 2 is a cross sectional view shown in contacting position.

Figure 2 shows a cross sectional view of the invention in the deformed or contact making position. When a weight is placed on top of the switch, the upper conducting strip 1 is temporarily flattened to cause it to come in contact with the lower conducting strip 2, thereby establishing an electrical circuit which may be used for any purpose desired.

Figure 3:
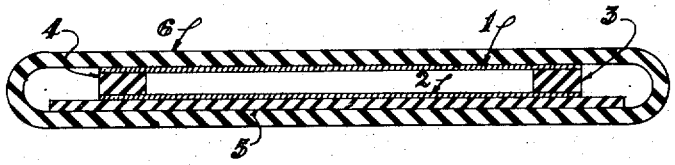
Figure 3 is a cross sectional view shown in bent or coiled position.

Figure 3 shows the position of the respective members when the tape switch is bent or coiled. In this condition, the conductor members 1 and 2 are substantially parallel, because it is the nature of the concave strip to lose all transverse concavity when rolled into a coil. This useful property permits bending or coiling the tape switch into extremely sharp radii without short circuiting.

A plurality of lengths of the tape switch may be laid side by side to form a mat to provide wide enough coverage so that it may not be stepped over.

Figure 4A:
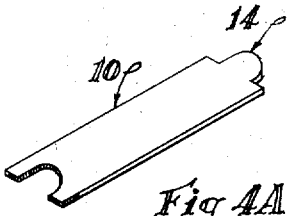
Figures 4 and 4A are detailed views showing an embodiment of the invention having overlapping leaves in one contacting member.
Figure 4:
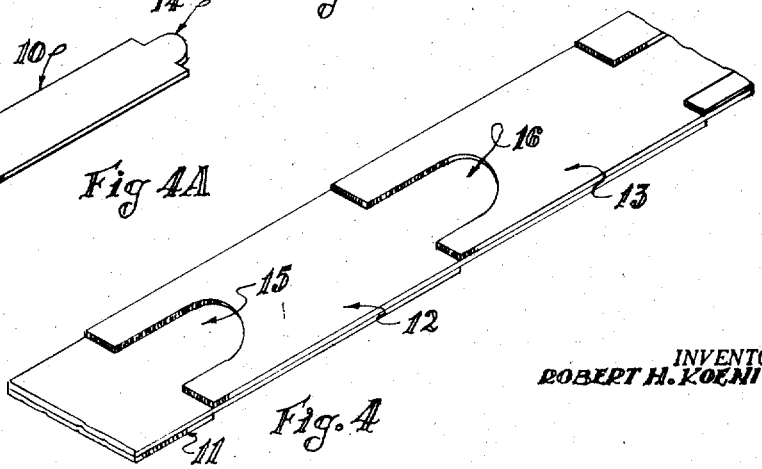

Figures 4 and 4A show details of the overlapping leaves which may be used in one or both of the conductor strips to prevent buckling of that conductor when coiled.

Figure 4A shows an individual segment 10, and Figure 4 shows segments 11, 12, 13, etc. in overlapping relation.

The purpose of the notches 15, 16, etc. is to prevent shorting out. A short circuit would most likely arise at the center of the free ends as the tape switch is bent, since the edges are held by the edge insulating strips. Therefore, these free ends are notched to avoid this possibility. The center fingers 14 are merely the result of the notching.

I claim:

1. An electrical tape switch adapted to be coiled like a cable comprising a pair of spaced continuous uniform conducting strips [having a slight transverse curvature], and a pair of insulating strips placed between said conducting strips adjacent the outer edges thereof, [a continuous flat insulating strip placed under said conducting strips, and continuous weatherproof jacket enclosing said strip,] wherein at least one of said conductor strips comprises segmented overlapping leaves adapted to move axially with respect to each other, thereby permitting coiling and bending without buckling, the outer of said strips being axially stretched and the inner of said strips being axially compressed.

2. An electrical tape switch having a pair of uniform conductive members [each] *at least one* having a slight transverse curvature [concave in the same direction], and means to mount said strips in spaced relationship, including means to insulate said members from each other wherein at least one of said conducting strips comprises axially segmented slidable overlapping contacting leaf members adapted to permit coiling and bending of said tape switch, without shorting or damage due to buckling.

3. Apparatus as in claim 2 wherein said leaf members are notched at one end to lessen the possibility of shorting at sharp bends.

References Cited in the file of this patent or the original patent

UNITED STATES PATENTS

| | | |
|---|---|---|
| 774,436 | Johnson | Nov. 8, 1904 |
| 1,725,963 | Morris | Aug. 27, 1929 |
| 1,915,292 | Conklin | Jan. 27, 1933 |
| 1,928,472 | Wilcox | Sept. 26, 1933 |
| 1,950,490 | Geer et al. | Mar. 13, 1934 |
| 2,361,826 | Dowden | Oct. 31, 1944 |

FOREIGN PATENTS

| | | |
|---|---|---|
| 402,446 | Great Britain | Nov. 30, 1933 |